(12) United States Patent
Yamashita et al.

(10) Patent No.: US 6,400,969 B1
(45) Date of Patent: Jun. 4, 2002

(54) COMMUNICATION EQUIPMENT, CHARGING TERMINAL STRUCTURE AND ISOLATING SWITCH

(75) Inventors: Atsushi Yamashita; Shinya Kinoshita; Yuzo Oishi; Takashi Kamiya; Hiroshi Nishiyama, all of Fukuoka; Yoshihiro Nishikawa, Saga; Toru Sakata, Fukuoka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/300,408

(22) Filed: Apr. 27, 1999

(30) Foreign Application Priority Data

Jun. 12, 1998 (JP) .......................................... 10-164907
Jul. 23, 1998 (JP) .......................................... 10-207433

(51) Int. Cl.$^7$ ................................................ H04Q 7/32
(52) U.S. Cl. ..................... 455/573; 455/572; 320/114; 320/115
(58) Field of Search ................................ 455/571, 572, 455/573, 575, 90, 550, 462, 465, 63, 67.3, 69, 347; 379/446, 445, 454, 426, 61; 320/114, 115

(56) References Cited

U.S. PATENT DOCUMENTS

| | | | | |
|---|---|---|---|---|
| 4,545,639 A | * | 10/1985 | Holden ........................ | 455/573 |
| 5,479,486 A | * | 12/1995 | Saji .............................. | 455/573 |
| 5,867,798 A | * | 2/1999 | Inukai et al. ................. | 455/573 |
| 5,874,723 A | * | 2/1999 | Hasegawa et al. ........... | 320/115 |
| 5,949,215 A | * | 9/1999 | Takakura ...................... | 320/114 |
| 6,061,578 A | * | 5/2000 | Yoh .............................. | 455/573 |
| 6,185,302 B1 | * | 2/2001 | Rytkonen et al. ........... | 379/446 |

FOREIGN PATENT DOCUMENTS

JP          6-48252          6/1994

* cited by examiner

Primary Examiner—William Trost
Assistant Examiner—Keith Ferguson
(74) Attorney, Agent, or Firm—Wenderoth, Lind & Ponack, L.L.P.

(57) ABSTRACT

Communication equipment that is provided with an isolating switch, which is operated by placement of a handset, instead of a conventionally used insulating component. The isolating switch constitutes an electrical insulation between a charging, terminal of a base unit and an external electric circuit. This structure eliminates the necessity of providing an insulating component such as a transformer and the like, so as to achieve a cost reduction of the communication equipment, and also improves sound quality of the communication equipment. In addition, the isolating switch is arranged in Such a manner that a direction of tile force applied by the handset to depress the terminal of the base unit and a direction of the force applied by the handset to depress a switch level are separated from each other. The isolating switch has a construction that enables the switch lever to function with a small loading weight, and to keep a contact point of the switch depressed by an intense force. As a result, reliable operation of the switch is attained without increasing, the weight of the handset, since the is available weight of the handset can be utilized efficiently. Further, a mechanical structure for fixing the position of the handset can be eliminated, so as to simplify the overall structure of the communication equipment.

18 Claims, 14 Drawing Sheets

SEC. a-a

SEC. b-b

COMMUNICATION EQUIPMENT, CHARGING TERMINAL STRUCTURE AND ISOLATING SWITCH

FIELD OF THE INVENTION

The present invention relates to communication equipment for communicating through a telephone line, a structure of a charging terminal for charging a battery stored within a mobile communication apparatus, and an isolating switch used in the communication equipment.

BACKGROUND OF THE INVENTION

Generally, an internal battery of a mobile communication apparatus such as a portable telephone, a cordless telephone and the like (hereinafter referred to as "mobile apparatus") are charged when the mobile apparatus is placed on a battery charger or a telephone base unit (hereinafter referred to as "base unit"). On the other hand, the base unit has a structure that prevents an electrical shock from the charging terminal of the base unit by maintaining an insulating condition between the charging terminal and a telephone line while the mobile apparatus is not placed in position. An insulating component such as a transformer, a photo-coupler, a relay, a capacitor and the like device is generally utilized as a means to insulate the charging terminal of the base unit from the telephone network. Communication equipment, which is known in the prior art, will be described hereinafter by taking a cordless telephone as an example.

FIG. 15 shows a circuit structure of a base unit of a prior art cordless telephone . In FIG. 15, the base unit 3 is provided with a charging terminal 4 inside of a handset holder ("cradle") so as to charge a battery within a handset 1 by placing the charging terminal 4 on the base unit 3 into contact with a charging terminal 2 of the handset 1, when the handset 1 is stored in the cradle. In FIG. 15, reference numeral 8 represents a power supply, reference numeral 9 represents a transmitting circuit, reference numeral 10 represents a receiving circuit, and reference numeral 11 represents a telephone network. A charging circuit 5 in a secondary stage is separated from an interface circuit 6 in a primary stage with an insulating component 7 such as a transformer, a photo-coupler, a relay, a capacitor and the like, to prevent an electrical shock.

However, the foregoing prior art cordless-telephone is high in cost , because it utilizes the insulating component 7 such as a transformer, a photo-coupler, a relay, a capacitor and the like. Also, degradation in quality of talking sounds can result, if a transformer is used for the insulating component 7, since it causes a transmission loss. Moreover, there has been another problem of obstructing an improvement of sidetone characteristic, in which a transmitting signal makes an entry into a receiver, since it is difficult to match an impedance of the transformer with an impedance of the telephone network 11.

An object of the present invention is to insulate the charging terminal of communication equipment from a telephone network at a low cost, so as to provide communication equipment that is capable of preventing degradation of sound quality and improving the sidetone characteristic. Another object of the present invention is to provide a charging terminal, and an isolating switch for use in the same.

SUMMARY OF THE INVENTION

The communication equipment of the present invention comprises a charging circuit, a charging terminal, and an isolating switch provided between the charging circuit and the charging terminal. Further, the communication equipment of the present invention comprises a mobile apparatus equipped with a rechargeable battery, and a stationary apparatus having a charging circuit in it for charging the battery. Both the mobile apparatus and the stationary apparatus have respective charging terminals, and the stationary apparatus includes an isolating switch between the charging terminal and the internal charging circuit. The communication equipment is intended for connection with a telephone network or an electric power line. Furthermore, the isolating switch contains a spring consisting of a first portion having a relatively small spring constant and a second portion having a relatively large spring constant. The foregoing structure of the communication equipment can eliminate an insulating component such as a transformer, a photo-coupler, a relay, a capacitor and the like, so as to achieve a cost reduction of the communication equipment.

A structure of the charging terminal of the present invention comprises a charging terminal disposed on a bottom surface of the mobile apparatus, a charging terminal disposed on the stationary apparatus, and an isolating switch having a lever to be actuated by the mobile apparatus. This structure of the charging terminal of the present invention divides the weight of the mobile apparatus into a direction of force to depress the charging terminal and another direction of force to depress the lever, so as to obtain sufficient contact pressure with the isolating switch with a small amount of force. Distributing the loading direction of the mobile apparatus in this manner can reduce the number of the component parts and simplify the structure.

The isolating switch of the present invention comprises the spring which includes a first portion having a relatively small spring constant and a second portion having a relatively large spring constant, a lever, and a pair of electric contact points. The switch is operated by depressing the lever with a force created by the first portion of the spring, and pressurizing the electric contact points with a force created by the second portion of the spring. The foregoing structure is capable of obtaining proper contact pressure even when a lightweight mobile apparatus is placed on the stationary apparatus, thereby ensuring an electrical connection.

DESCRIPTION OF THE PREFERRED EMBODIMENTS

As example of communication equipment of the present invention, particularly a cordless telephone, will be described in detail below.

First Embodiment

Figure 1:
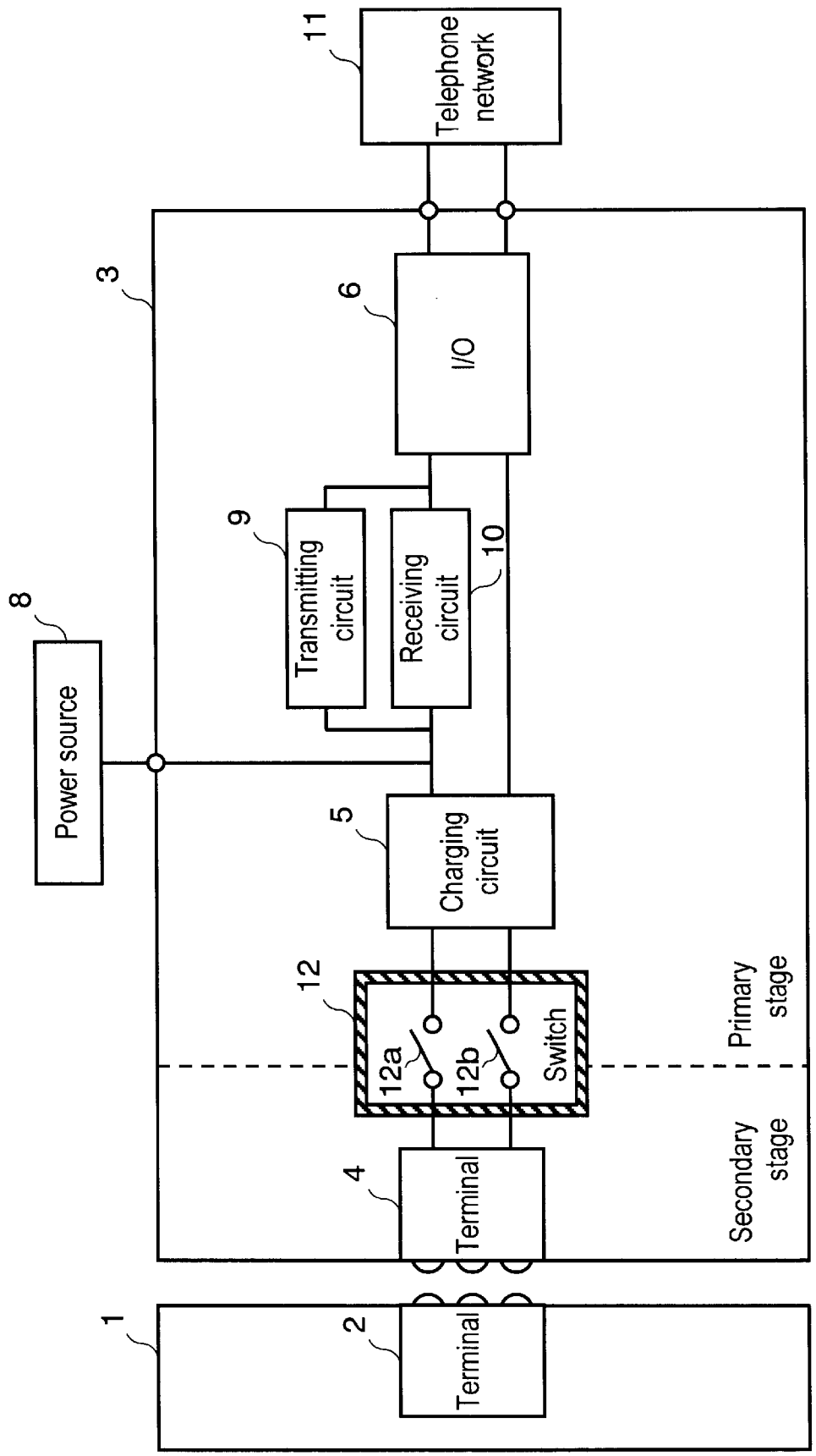
FIG. 1 is a block diagram depicting a communication system of a first embodiment of the present invention.

FIG. 1 is a schematic diagram of a cordless telephone of the first embodiment. Any parts having the same structure as the foregoing example of the prior art are assigned the same reference numerals.

FIG. 1, reference numeral 1 represents a handset (a mobile apparatus) of the cordless telephone, reference numeral 2 represents a charging terminal provided on the handset 1, reference numeral 3 represents a base unit (a stationary apparatus) of the cordless telephone. The base unit 3 is provided in its interior with a charging circuit for charging a battery within handset 1, and an up interface circuit, etc. for connection with a telephone network. Reference numeral 4 represents a charging terminal provided on the base unit 3. The handset 1 is stored in a cradle formed in the base unit 3. Reference numeral 5 represents the charging circuit, and reference numeral 6 represents the interface circuit. Reference numeral 8 represents a power supply, reference numeral 9 represents a transmitting circuit, reference numeral 10 represents a receiving circuit, and reference numeral 11 represents a telephone network.

The base unit 3 is provided with the charging terminal 4 at an inside of the cradle so that exposed portions of the charging terminal 2 of the handset 1 and charging terminal 4 of the base unit 3 make contact with each other, when the handset 1 is stored in the cradle. Reference numeral 12 represents an isolating switch. The isolating switch 12 is provided between the charging terminal 4 and the charging circuit 5 of the base unit 3, and it has a pair of contacts 12a and 12b corresponding respectively with a positive terminal and a negative terminal of the charging circuit 5.

The isolating switch 12 is operated when the handset 1 is placed in the base unit 3, so as to simultaneously close the pair of contacts 12a and 12b. If the handset 1 is removed from the base unit 3, both of the contacts 12a and 12b separate from the charging circuit 5, and the positive terminal and the negative terminal of the charging circuit 5 are cut off electrically from the charging terminal 4.

The isolating switch 12 is provided in a position that is recessed from a cabinet of the base unit 3, i.e., a location adjacent to the charging terminal 4 in the cradle 13 of the base unit 3.

Figure 2:
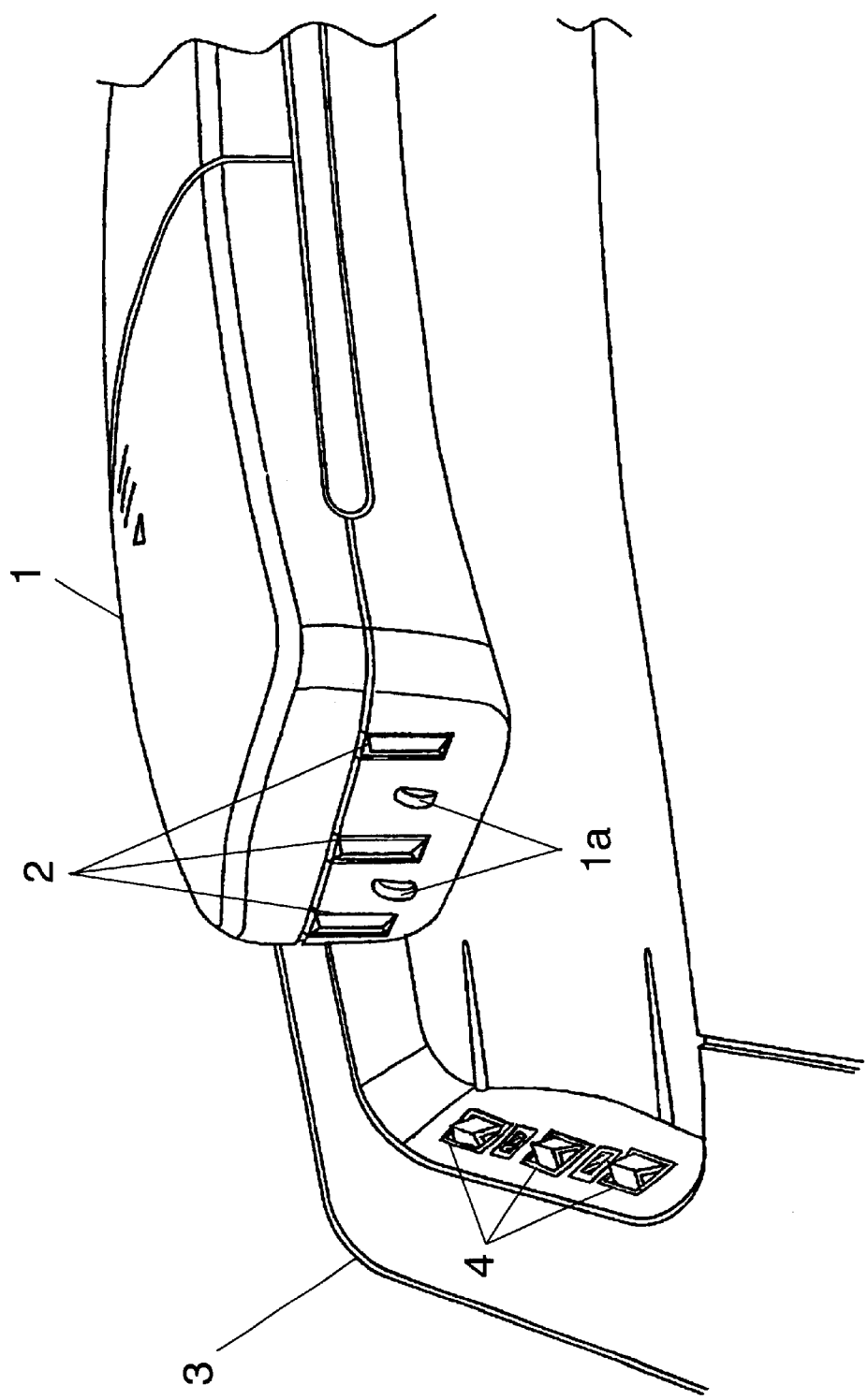
FIG. 2 is a perspective view depicting a communication equipment provided with a charging terminal structure and an isolating switch of the first embodiment.

FIG. 2 is an external perspective view depicting a charging terminal structure in the exemplary embodiment of the present invention, and FIG. 3 is a detailed drawing showing a charging terminal structure and an isolating switch of the same embodiment. In FIG. 2, the charging terminal 2 is disposed on a bottom surface of the handset 1. Reference numeral 1a represents projections formed on the bottom surface of the handset 1 for depressing, the lever on the base unit.

Figure 3A:
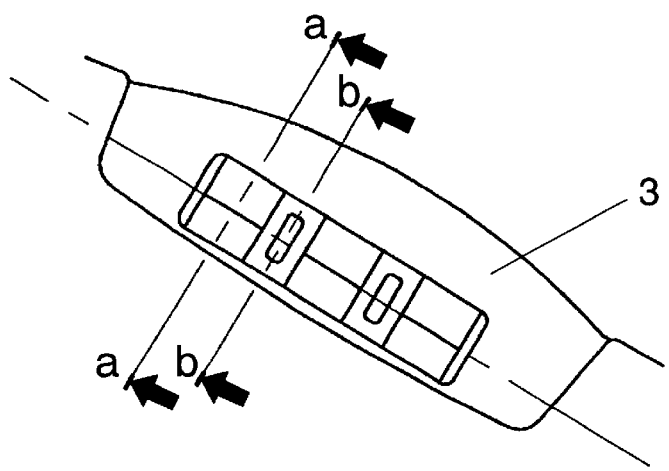
FIG. 3A is a drawing depicting a charging terminal structure of a base unit of the first embodiment.
Figure 3B:
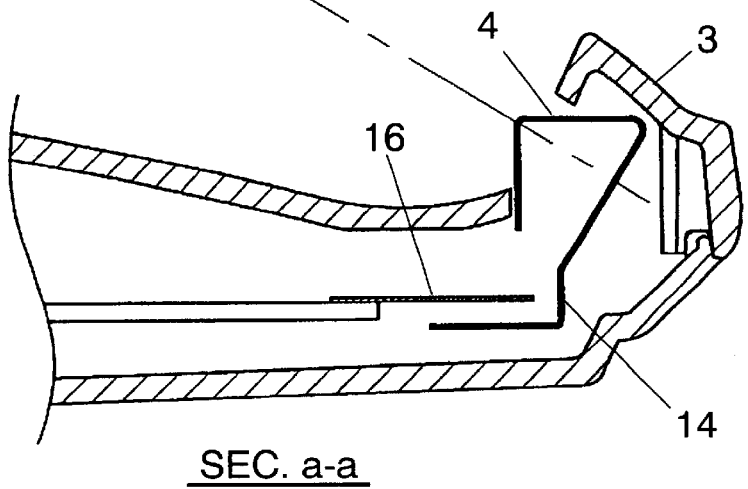
FIG. 3B is a cross sectional view of a base unit taken along line 3b—3b shown in FIG. 3A.
Figure 3C:
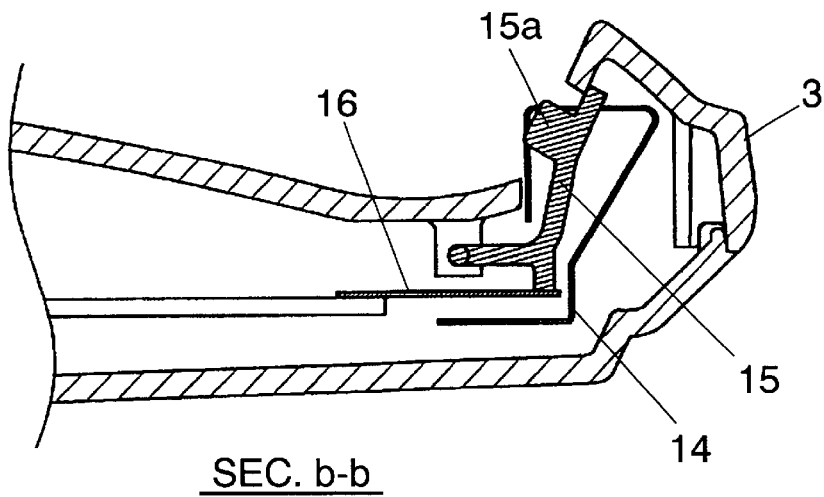
FIG. 3C is a cross sectional view of a base unit taken along line 3c—3c shown in FIG. 3A.

FIG. 3B is a sectional view of the base unit 3 taken along a line 3b—3b shown in FIG. 3A, and FIG. 3C is a sectional view of the base unit 3 taken along a line 3c—3c shown also in FIG. 3A, In FIG. 3C, the charging terminal 4 provided in the base unit 3 is fabricated by bending a flat spring material made of metal. One end of the charging terminal 4 extends into the interior of the cradle, and is held by a resilient plate-shaped portion 14. Reference numeral 15 represents a lever that is retained movably between a protruded position and a retracted position. Reference numeral 16 represents a plate spring member connected electrically with the charging circuit.

When the handset 1 is not stored in the base unit 3, the lever 15 on the base unit is not pushed in, so that the charging terminal 4 on the base unit is isolated from the plate spring member 16, as shown in FIG. 3C, thereby keeping the isolating switch 12 in an OFF position. Under the above condition, an exposed portion of the charging terminal 4 and the telephone network 11 are insulated in the circuitry.

Figure 4:
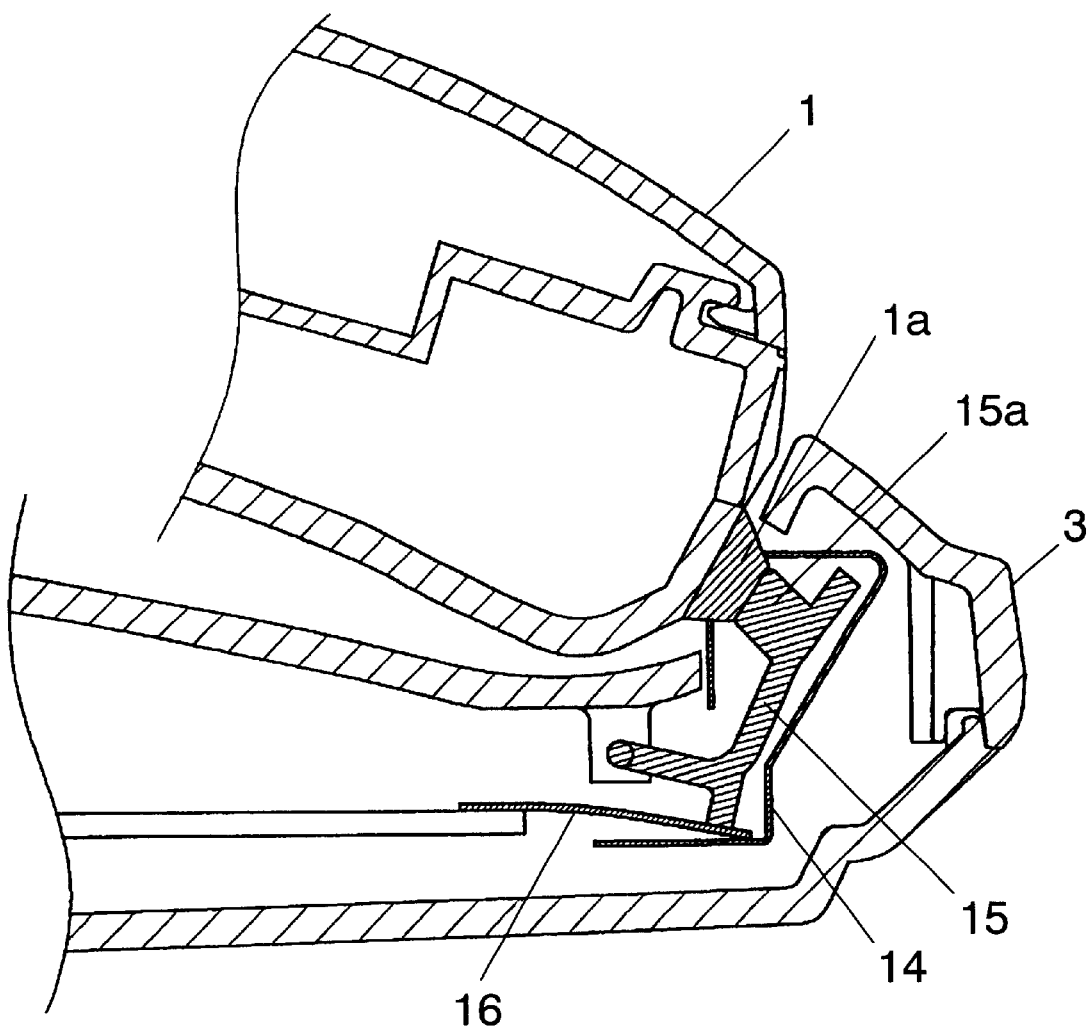
FIG. 4 is a cross sectional view depicting a charging terminal structure and an isolating switch of the first embodiment when a handset is in a position for being charged.

If the handset 1 is placed in the cradle of the base unit 3, as shown in FIG. 4, the lever 15 is depressed by the projection 1a of the handset 1, so as to cause the lever 15 to press the plate spring member 16 into contact with the plate-shaped portion 14. The contact of the plate spring member 16 with the plate-shaped portion 14 establishes contact between the charging circuit and the charging terminal 4, to thereby turn the isolation switch 12 into an ON position. Consequently, a charging current flows through the plate spring member 16, the plate-shaped portion 14, and the terminals 4 and 2 toward the handset, so as to charge the battery in the handset. Although there is a contact during this time between the charging terminal 4 of the base unit and the telephone network 11, the charging terminal 4 is not accessible to contact by any person under this condition, and thus concern of an electrical shock is avoided.

As has been described, the cordless telephone of the present exemplary embodiment is provided with the isolating switch, which functions by placement or removal of the handset on the base unit, in order to insulate, from the telephone network, a portion of the charging terminal on the base unit that is exposed from the base unit. This eliminates the necessity of an insulating component such as a transformer, a photo-coupler, a relay, a capacitor and the like, thereby enabling a cost reduction of the cordless telephone. The embodiment can also prevent a degradation of sound quality and improve the sidetone characteristic of the telephone, since there is no need to use a transformer.

Second Embodiment

Figure 5:
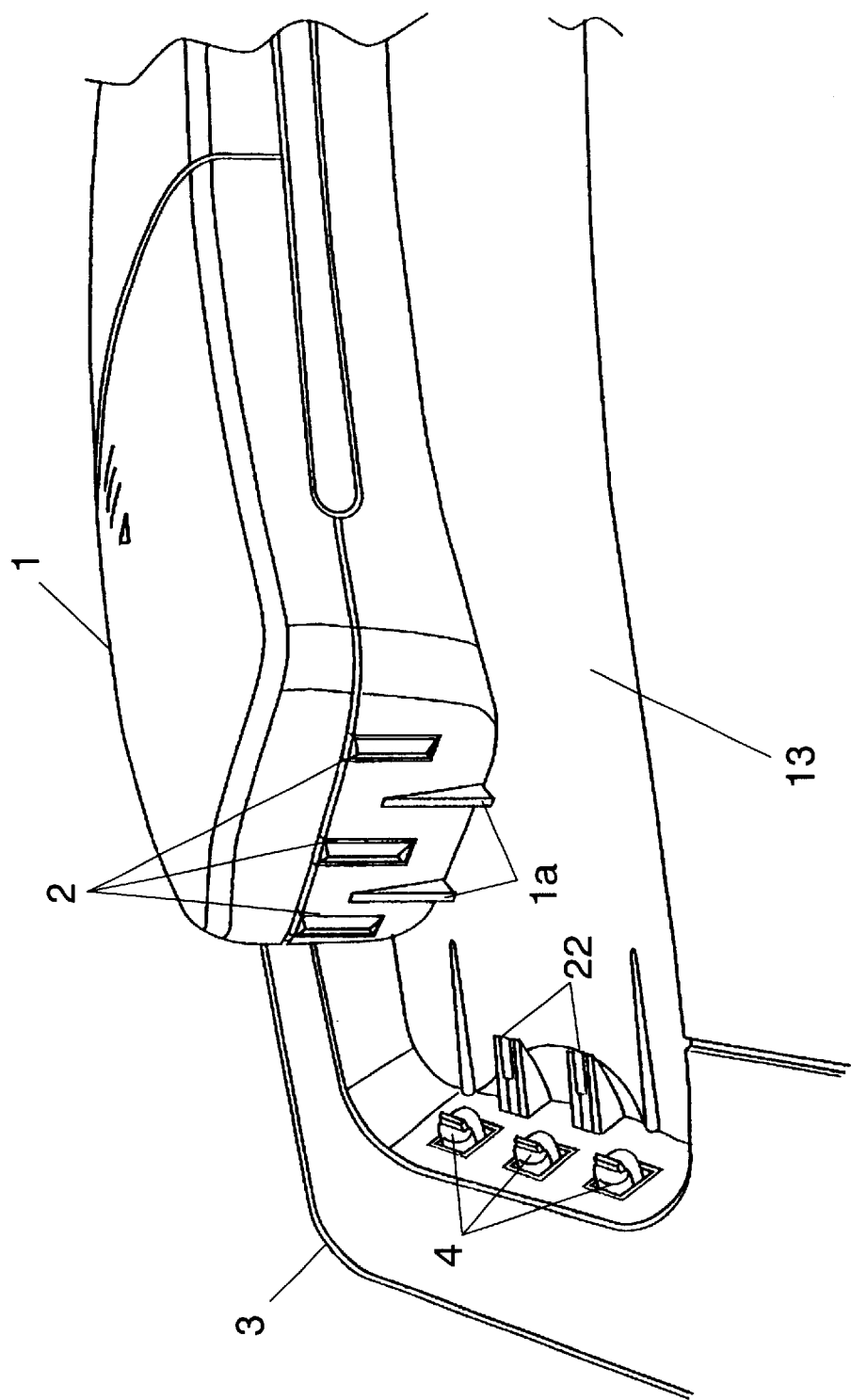
FIG. 5 is a perspective view depicting communication equipment provided with a charging terminal structure and an isolating switch constructed in accordance with a second embodiment of the present invention.
Figure 6:
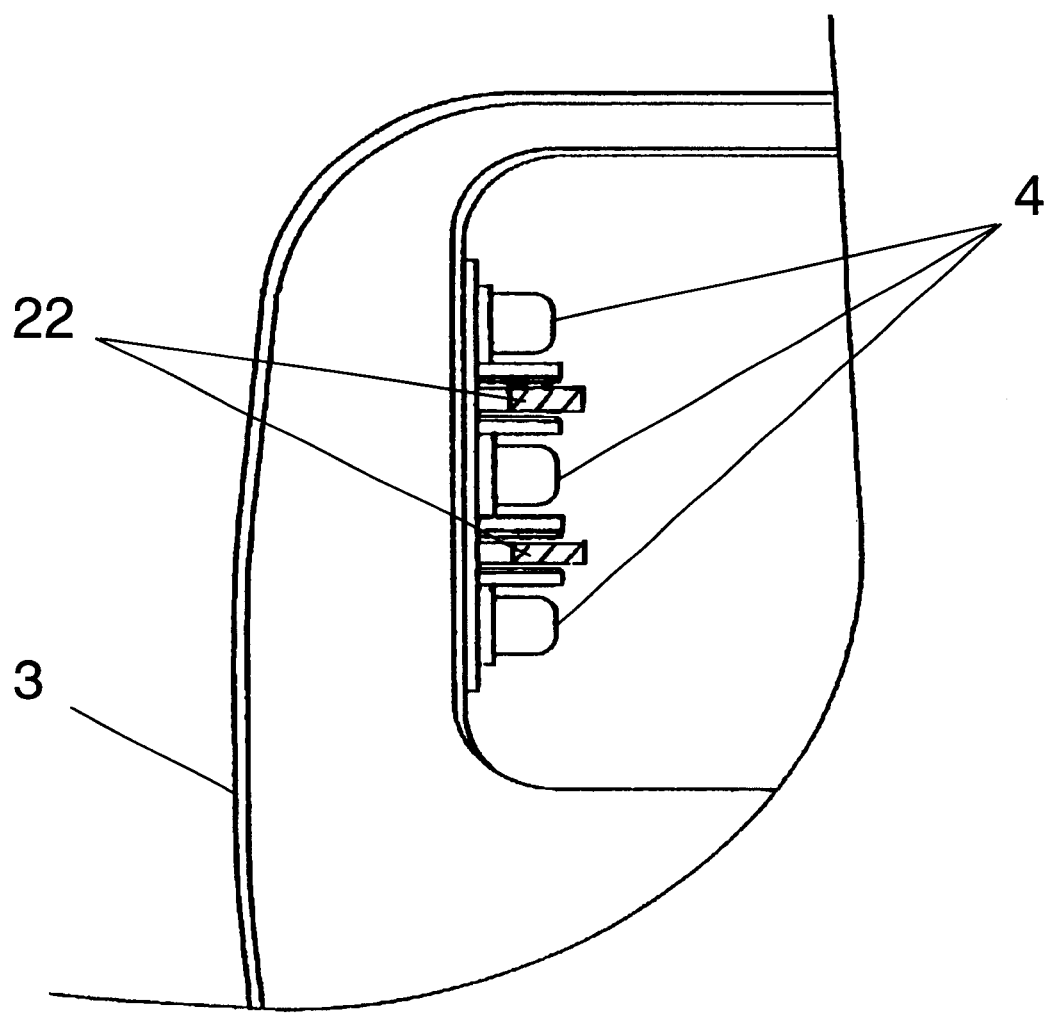
FIG. 6 is a plan view depicting a charging terminal portion of a base unit of the second embodiment.

FIG. 5 is an external perspective view depicting a charging terminal constructed in accordance with a second embodiment of the present invention, and FIG. 6 is a plan view depicting a charging terminal of a base unit. In FIG. 5, a charging terminal 2 of a handset is disposed on a bottom surface of the handset 1. An isolating switch, provided in the base unit 3, is so constructed that it isolates the charging terminal 4 from the charging circuit in the base unit when the handset 1 is not stored in the base unit 3.

Figure 7:
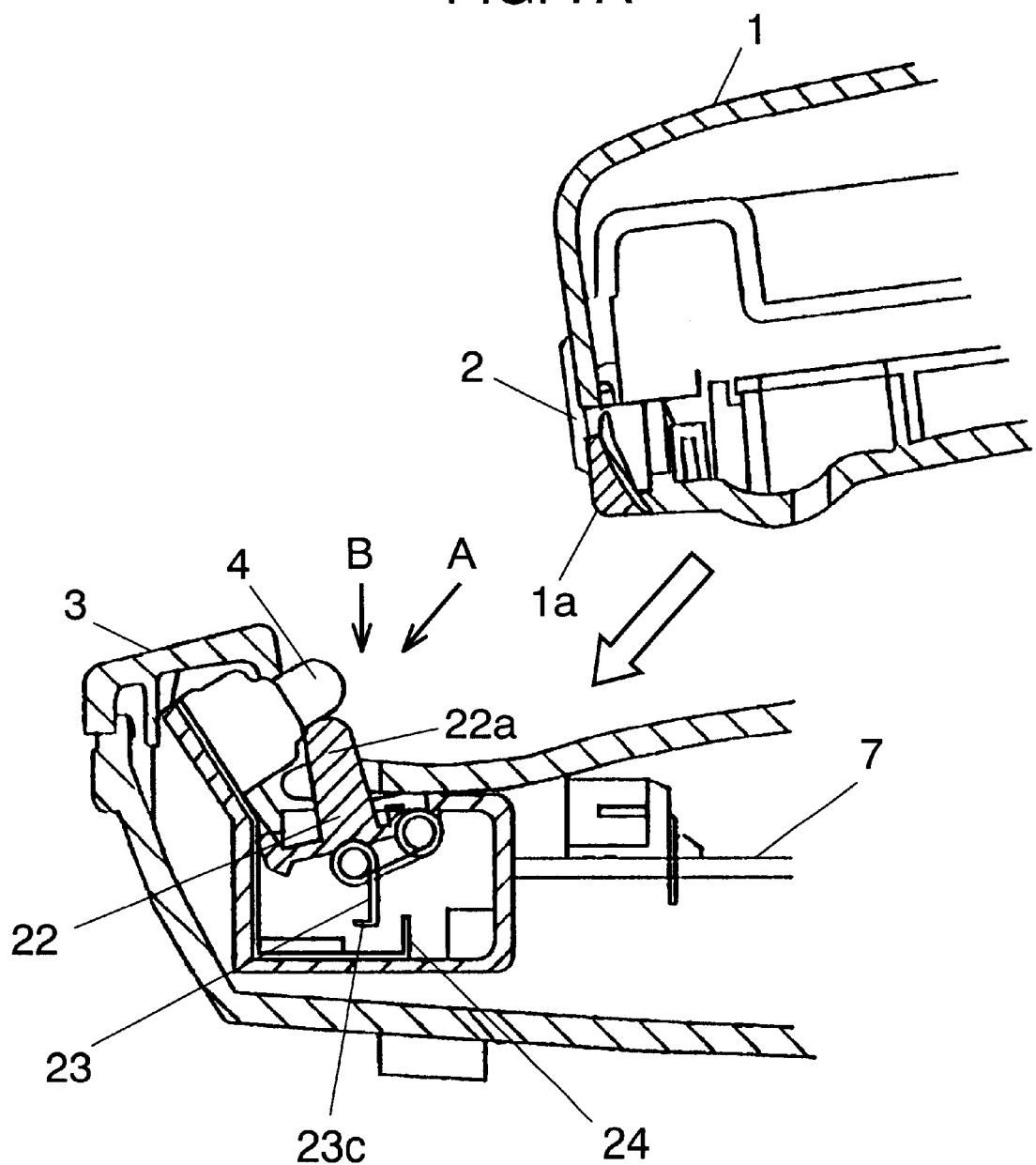
FIG. 7A is a sectional view depicting a charging terminal structure of a mobile apparatus of the second embodiment of the present invention.
FIG. 7B is a sectional view depicting a charging terminal structure and an isolating switch of the base unit of the second embodiment.

FIG. 7 is a drawing depicting a charging, terminal structure and an isolating switch structure of the second embodiment. In FIG. 7, reference numeral 22 represents a lever retained movably between a protruded position and a retracted position. A tip end 22a of the lever 22 protrudes from a bottom portion of the cradle.

An arrow marked "A" indicates the direction of a depressing force, which is applied to the charging terminal 4 of the base unit by the charging terminal 2 of the handset. An arrow marked "B" indicates the direction of a depressing force, which is applied to the lever 22 by the handset. The second embodiment is constructed so that the isolating switch can be operated with a small loading weight due to the distribution of the loading direction of the handset. Accordingly, a sufficient loading weight can be applied to the charging terminals to ensure an electrical connection of the charging terminals.

Reference numeral 24 represents a metal plate conducively connected with the charging terminal 4. Reference numeral 23 represents a torsion spring having a structure of a double-torsional spring. The torsion spring 23 functions as a contact point of the charging, circuit by coming into contact with the metal plate 24. The torison spring also acts to push the lever 22 upward.

Figure 8:
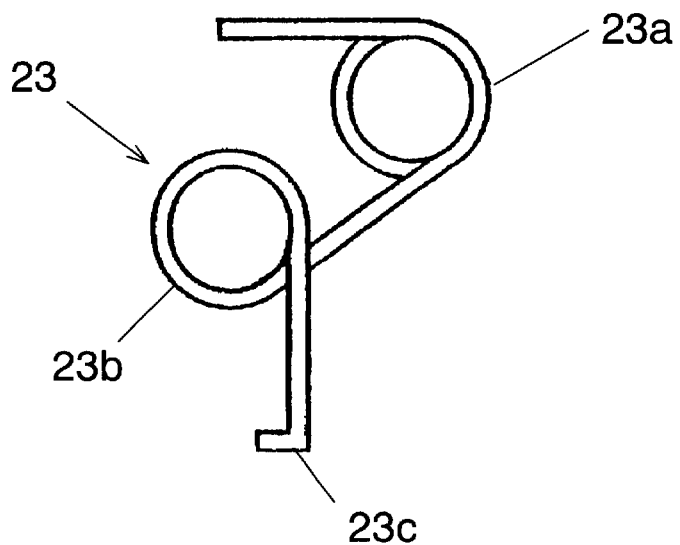
FIG. 8 shows a torsion spring used in the isolating switch of the second embodiment of the present invention.

FIG. 8 is a detailed drawing showing a structure of the torsion spring 23, which includes a first coil portion 23a, a second coil portion 23b and a contact point 23c. In FIG. 7, the torsion spring 23 is connected electrically to the charging circuit in the base unit, and also it is fabricated in such a manner that the contact point 23c of the torsion spring 23 comes into contact with the metal plate 24 to establish an electrical contact between the charging circuit and the charging terminal 4.

The first coil portion 23a has a relatively small spring constant, and the force created by the first coil portion 23a pushes the lever 22 upward. The second coil portion 23b has a relatively large spring constant, and the force created by the second coil portion 23b presses the contact point 23c against the metal plate 24.

A distance between terminals of the isolating switch, i.e. a spacing between the contact point 23c and the metal plate 24 in their OFF position, is designed to be 2.5 mm in order to ensure safety. The distance may be altered depending on the particular country, since safety standards vary from one country to another.

The metal plate 24 is connected to the charging terminal 4 of the base unit 3, and the torsion spring 23 is connected to the charging circuit 5. Therefore, the turning-on or turning-off operation of the isolating switch makes or breaks the connection between the charging terminal 4 of the base unit 3 and the chagrin circuit 5. In FIG. 7, reference numeral 17 represents a circuit board in the base unit 3.

A projection 1a is formed, as shown in FIG. 7, on the bottom portion of the handset 1 and is intended to depress the lever 22. When the handset 1 is not stored in tile cradle 13 of the base unit 3, the lever 22 on the base unit is not pushed in, so that the metal plate 24 and the contact point 23c are separated to keep the isolating switch in the OFF position. Under this condition, an exposed portion of the charging terminal 4 on the base unit and the telephone network 11 are insulated.

Figure 9:
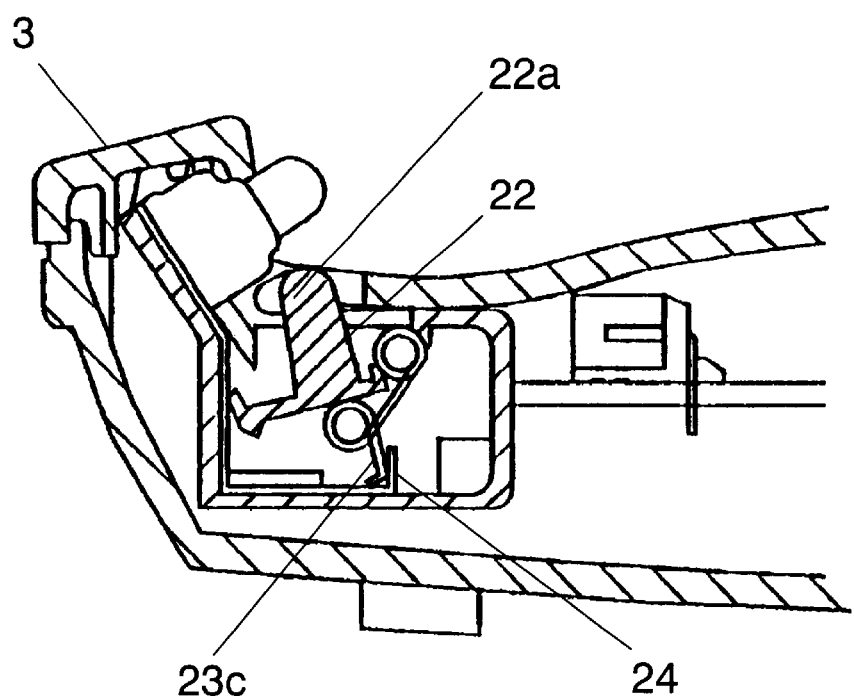
FIG. 9 is a sectional view depicting the isolating switch of the second embodiment of the present invention.

When the handset 1 is stored in the cradle 13 of the base unit 3, the lever 22 of the isolating switch 12 is depressed by the projection 1a on the handset 1, so as to turn the isolating switch to the ON position. FIG. 9 depicts the lever 22 in its pushed-in position, in the second embodiment. If the handset 1 is stored in the base unit 3 the projection 1a on the handset strikes the lever 22, so that the lever 22 is pushed in as shown in FIG. 9. This presses the internal contact point 23c firmly against the metal plate 24.

A charging current flows through the contact point 23c, the metal plate 24, the charging terminals 4 and 2 toward the handset, and the battery in the handset is charged in this manner, as a result of the contact between the metal plate 24 and the contact point 23c. Although there is contact during this time between the charging terminal 4 of the base unit and the telephone network 11, the charging terminal 4 is not accessible to contact by any person under this condition, thus avoiding concern of an electrical shock.

Third Embodiment

Figure 10:
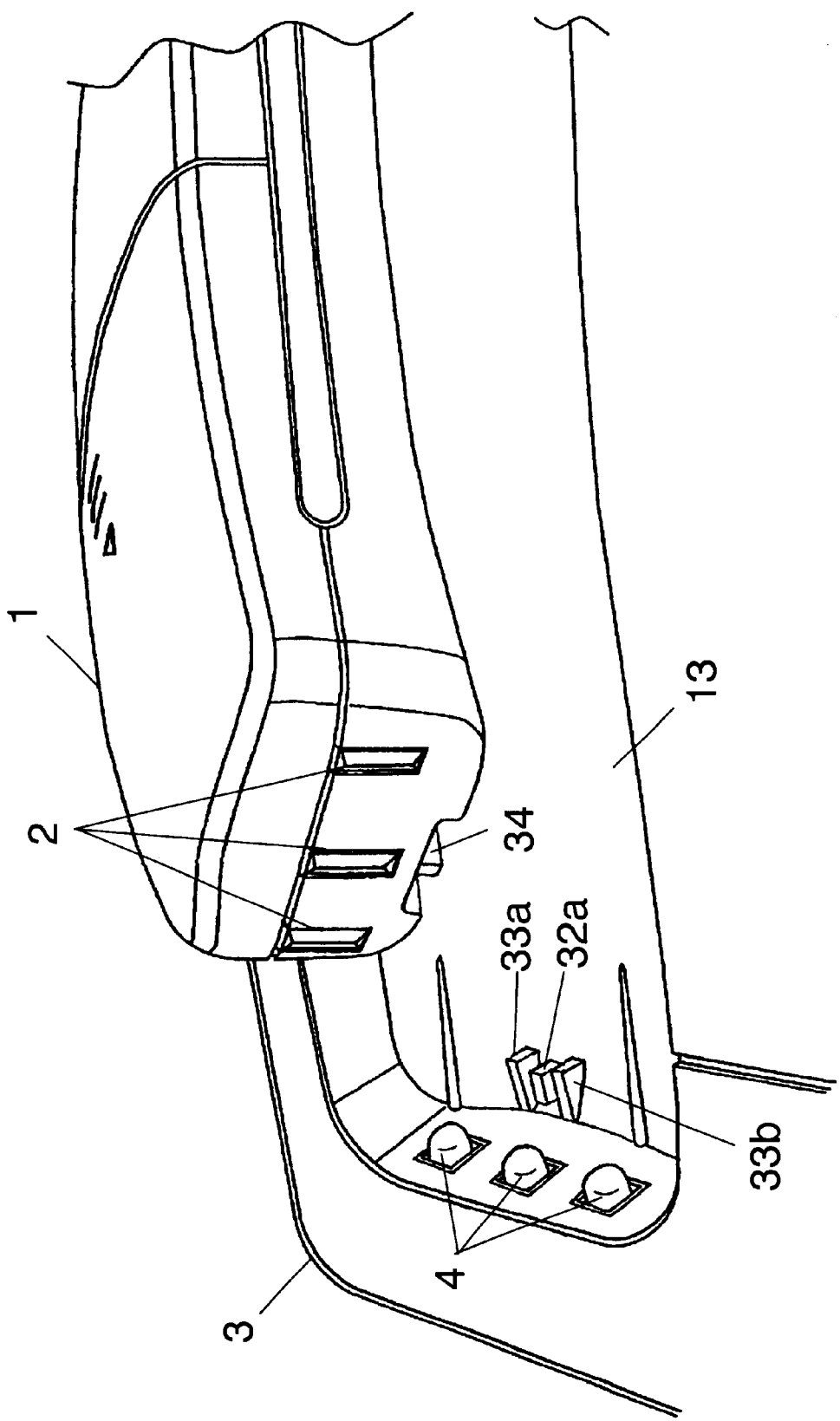
FIG. 10 is an external view depicting communication equipment provided with a charging terminal structure and an isolating switch constructed in accordance with a third embodiment of the present invention.
Figure 11:
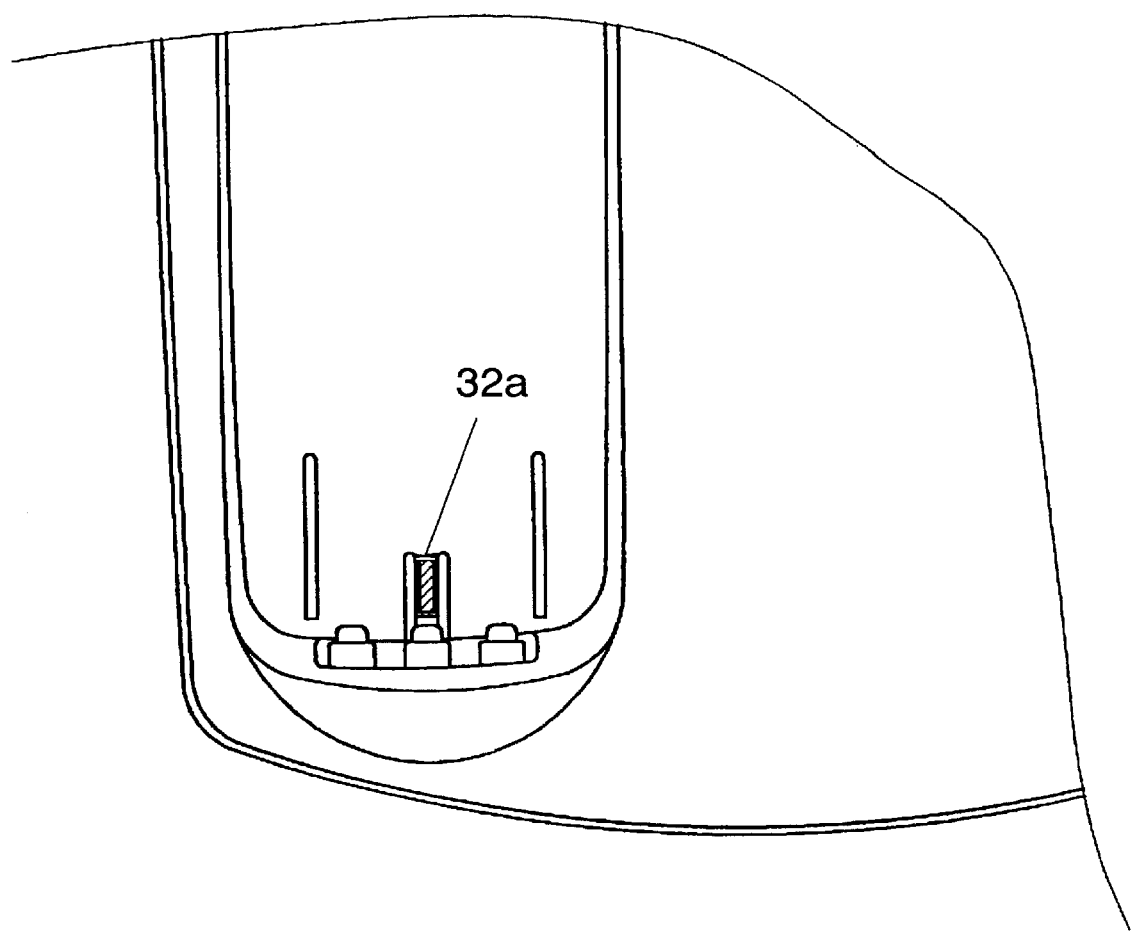
FIG. 11 is a plan view depicting a charging terminal structure of a base unit of the third embodiment of the present invention.

FIG. 10 is an external perspective view depicting a charging terminal constructed in accordance with a third embodiment of the present invention, and FIG. 11 is a plan view depicting a charging terminal structure of a base unit. In FIGS. 10 and 11, a charging terminal 4 of the base unit and a charging terminal 2 of the handset are arranged in the same positions as in the case of the second embodiment. An isolating switch provided in the base unit 3 cuts off contact between the charging terminal 4 of the base unit and a charging Circuit, when the handset 1 is not stored in the base unit 3, in the same manner as the second embodiment.

Figure 12A:
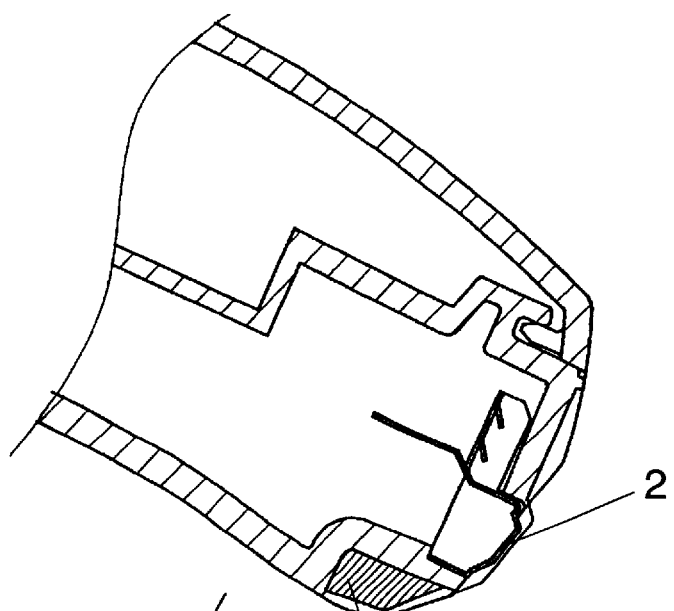
FIG. 12A is a sectional view depicting a charging terminal structure of a mobile apparatus of the third embodiment of the present invention.

FIG. 12 is a detailed drawing showiest the charging terminal structure and an isolating switch structure of the third embodiment. In FIG. 12, reference numeral 32 represents a lever retained movably between a protruded position and a retracted position on a bottom portion of a cradle of the base unit 3. The lever 32 is supported rotatably about an axis 35, and a tip end 32a of the lever 32 protrudes at the bottom portion of the cradle. A loading direction of the handset in this embodiment is also distributed by diverting it into the direction of a depressing force applied to the charging terminal 4 of the base unit by the charging terminal 2 of the handset, and the direction of a depressing force applied to the lever 32 by the handset.

Reference numerals 33a and 33b represent ribs formed protrusively on the bottom portion of the cradle of the base unit 3. The ribs are positioned on both sides of the lever 32 in such a manner so as to sandwich the lever 32. The ribs 33a and 33b of the present embodiment prevent the lever 32 from being pushed in inadvertently, or even if a person attempts to depress the lever 32 with a finger.

In the handset 1, reference numeral 34 represents a projection for depressing the lever 32. The width of the projection 34 is narrower than the space between the ribs 3a and 33b, so as to allow the projection 34 to enter into the space between the ribs 33a and 33b, so that the lever 32 can be pushed in.

Reference numeral 17 represents a circuit board located in the base unit 3, and reference numeral 35 represents a metal plate connected conductively with the charging terminal 4. Reference numeral 36 represents a torsion spring having, a structure of double-torsional spring, which functions as the contact point of the charging circuit by coining into contact with the metal plate 35. The torison spring also maintains thrusting force on the lever 32 in a direction toward the protrusion.

Figure 14:
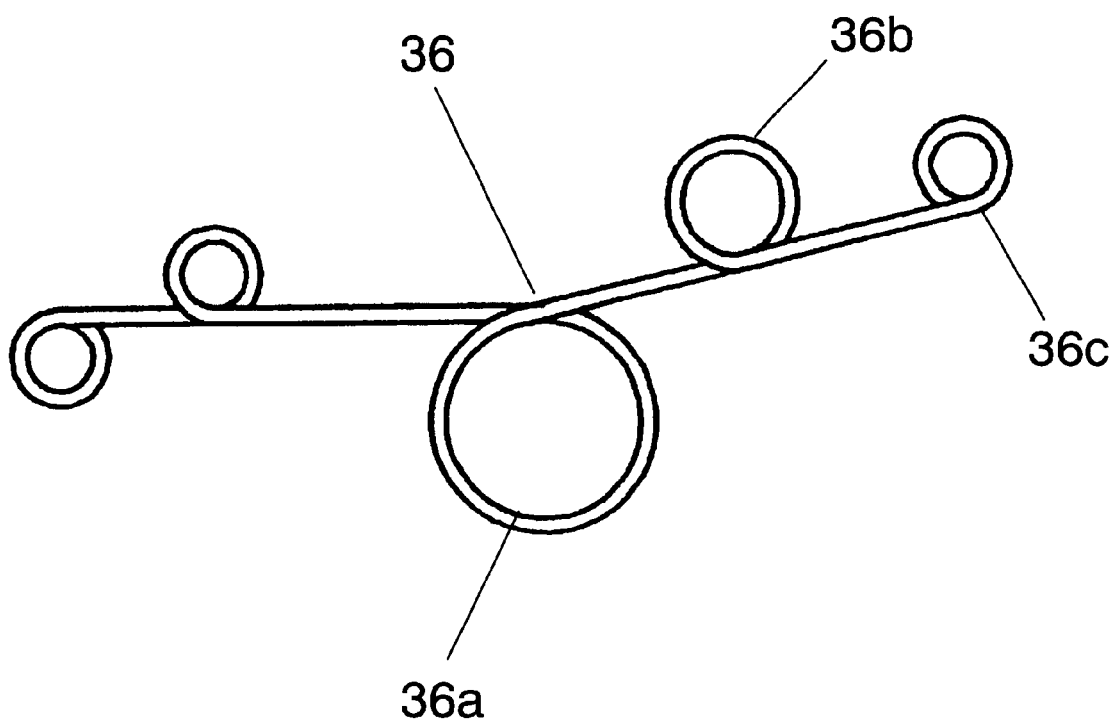
FIG. 14 is a torsion spring of the third embodiment of the present invention.
Figure 15:
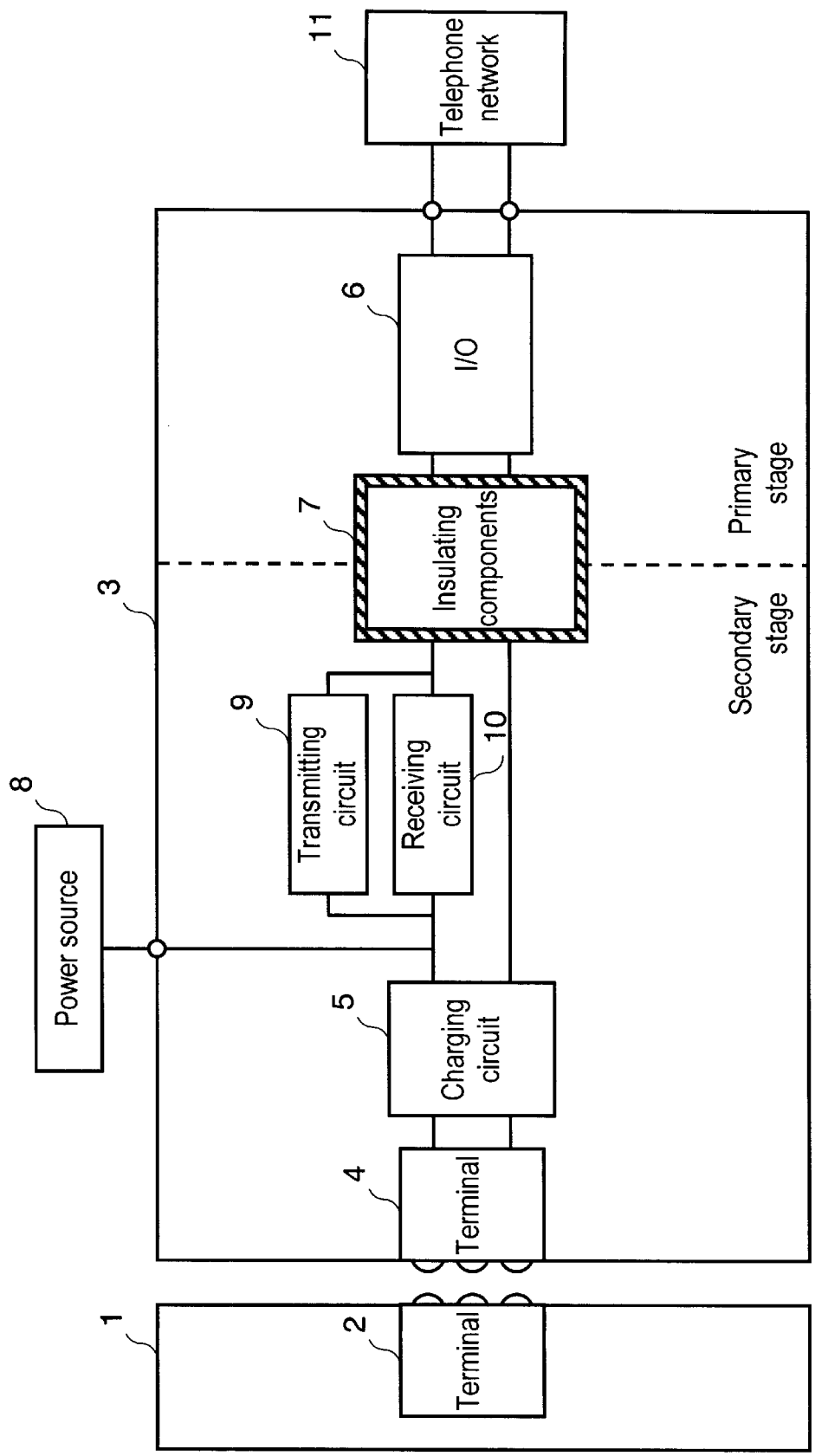
FIG. 15 is a block diagram depicting a prior art communication system.

FIG. 14 is a detailed drawing showing the torsion spring 36, which includes a first coil portion 36a, a second coil portion 36b and a contact point 36c. The torsion spring 36 is held in a position to connect electrically with the charging circuit, so as to establish electrical contact between the charging circuit and the charging terminal 4 by the contact point 36c of the torsion spring 36 that comes into contact with the metal plate 35.

The first coil portion 36a has a relatively small spring constants and a force created by the first coil portion 36a pushes the lever 32 upward. The second coil portion 36b has a relatively large spring constant, and a force created by the second coil portion 36b presses the contact point 36c firmly against the metal plate 35.

The metal plate 35 is electrically connected to the charging terminal 4 of the base unit 3, and the torsion spring 36 is electrically connected to the charging circuit 5 shown in FIG. 1. The charging terminal 4 of the base unit 3 is connected to or cut off from the charging circuit 5 by a turning-on or a turning-off operation of the isolating switch 32.

Figure 12B:
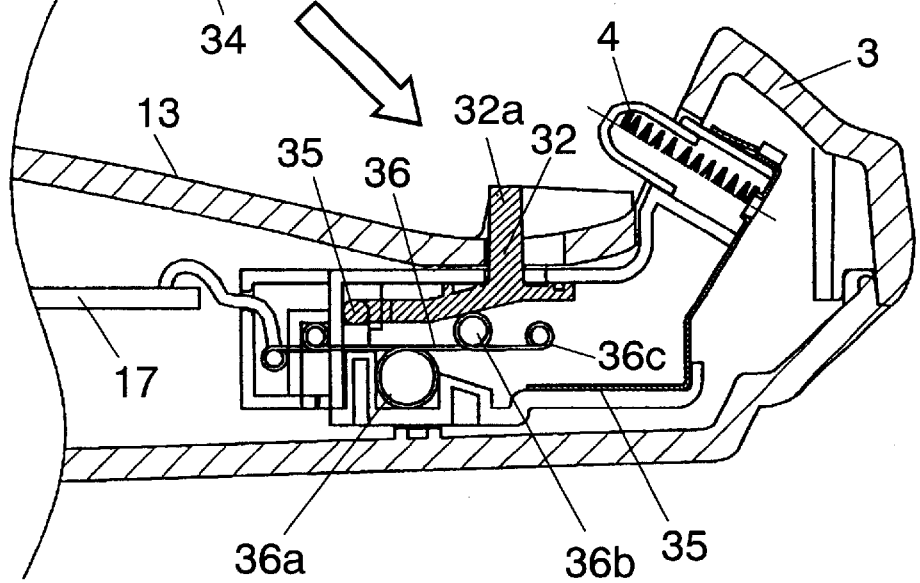
FIG. 12B is a sectional view showing a charging terminal structure and an isolating switch of the base unit of the third embodiment of the present invention.

When the handset 1 is not stored in the cradle 13 of the base unit 3, the lever 32 on the base unit is not pushed in, so that the metal plate 35 and the contact point 36c are separated from each other in order to keep the isolating switch in the OFF position, as shown in FIG. 12B. Under this condition, the charging terminal 4 and the telephone network 11 are insulated Also, the ribs 33a and 33b, formed on the bottom part of the cradle, can prevent a person from depressing the lever 32 inadvertently and making an electrical contact between the charging terminal 4 and the telephone line 11.

Figure 13:
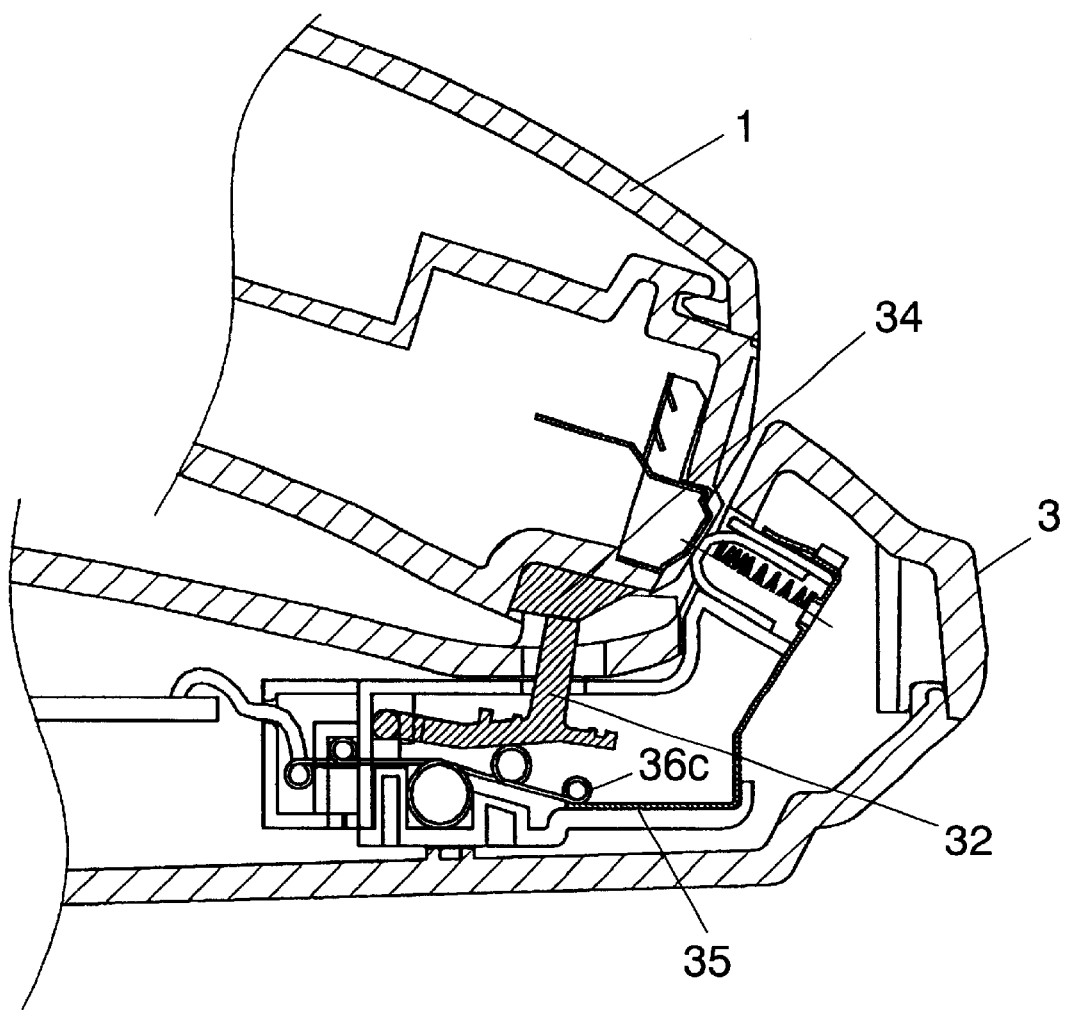
FIG. 13 is a sectional view depicting a charging, terminal structure and an isolating switch of the third embodiment of the present invention when a handset is in a position for being charged.

When the handset 1 is store in the cradle 13 of the base unit 3, as shown in FIG. 13, the lever 32 is pushed down by the projection 34 on the handset 1. This results in the contact point 36c of the torsion spring 36 contacting the metal plate 35, and turns the isolating switch into the ON position to charge the battery in the handset 1. Although there is continuity during this time between the charging terminal 4 of the base unit and the telephone network 11, the charging terminal 4 is not accessible by any person under this condition, thereby avoiding the concern of an electrical shock. As obviously known from the foregoing, the communication equipment of the present invention is provided with an isolating switch, which is operated by placement or removal of a mobile apparatus onto a stationary apparatus, in order to insulate a charging terminal of the stationary apparatus from a telephone network. This eliminates the necessity of an insulating component such as a transformer, a photo-coupler, a relay, a capacitor and the like, which has been used previously for the insulating purpose. This enables a cost reduction of the communication equipment. Further, the invention can also prevent a degradation of sound quality, since it does not necessitate the use of a transformer within a circuit of the communication equipment. Moreover, the present invention requires no consideration of the transformer impedance in designing the equipment, so as to make it easier to match the impedance with the telephone network, and to improve a sidetone characteristic, in which a transmission signal makes an entry into a receiver.

Although what has been described in the foregoing exemplary embodiments pertains mainly to a cordless telephone, the present invention applies effectively to any communication equipment that is used while being connected with a telephone network and/or an electric power line. In other words, the present invention can function effectively with a portable telephone, a facsimile machine, a portable computer, and the like devices.

What is claimed is:

1. Communication equipment comprising a base unit including:
   a mobile apparatus having a body;
   a charging circuit for charging a rechargeable battery disposed in said mobile apparatus;
   a charging terminal; and
   an isolating switch provided between said charging circuit and said charging terminal, said isolating switch comprising a spring member directly electrically coupled to said charging circuit and being operable by said body of said mobile apparatus to selectively electrically connect or disconnect said charging terminal and said charging circuit.

2. The communication equipment as claimed in claim 1, wherein said base unit is connected with a telephone network or an electric power line.

3. The communication equipment as claimed in claim 2, wherein said isolating switch has a plurality of contact points and a specified distance is maintained between said two of said contact points as required by a safety standard.

4. The communication equipment as claimed in claim 1, wherein said isolating switch has a plurality of contact points and a specified distance is maintained between any two of said contact points as required by a safety standard.

5. Communication equipment comprising:
   a mobile apparatus having a body and at least one charging terminal and carrying a rechargeable battery; and
   a stationary apparatus having at least one charging terminal and an internal charging circuit for charging said rechargeable battery, wherein said stationary apparatus includes an isolating switch disposed between said charging terminal of said stationary apparatus and said internally provided charging circuit, said isolating switch comprising a spring member directly electrically coupled to said charging circuit and being operable by said body of said mobile apparatus to selectively electrically connect or disconnect said charging terminal of said stationary apparatus and said charging circuit.

6. The communication equipment as claimed in claim 5, wherein said stationary apparatus is connected with a telephone network or an electric power line.

7. The communication equipment as claimed in claim 5, wherein said isolating switch can be actuated by said mobile apparatus.

8. The communication equipment as claimed in claim 5, wherein said isolating switch includes a lever which can be depressed by said mobile apparatus to actuate said isolating switch.

9. The communication equipment as claimed in claim 5, wherein said isolating switch has a plurality of contact points and a specified distance is maintained between any two of said contact points as required by a safety standard.

10. The communication equipment as claimed in claims 5, wherein said isolating switch is provided with a pair of contacts corresponding to a positive terminal and a negative terminal of said charging circuit, and said pair of contacts open or close simultaneously upon operation of said isolation switch.

11. The communication equipment as claimed in claim 5, wherein said isolating switch is provided with a spring including a first portion having a relatively small spring constant and a second portion having a relatively large spring constant.

12. The communication equipment as claimed in claim 11, wherein said isolation switch includes a lever, and said first portion of said spring pushes said lever, and said second portion of said spring is capable of depressing an electric contact point.

13. The communication equipment as claimed in claim 5, wherein said stationary apparatus is provided with a recessed portion for storing said mobile apparatus.

14. A charging apparatus comprising:
   a mobile unit having a body, and a charging terminal disposed on a bottom surface of said mobile unit;
   a stationary unit having an internal charging circuit and a charging terminal exposed on said stationary unit; and
   an isolating switch disposed in said stationary unit, said isolating switch comprising a spring member directly electrically coupled to said charging circuit and being operable by said body of said mobile unit to selectively electrically connect or disconnect said charging terminal of said stationary apparatus and said charging circuit and being provided with a lever and being capable of contacting said mobile unit, wherein a weight of said mobile unit is divided into a direction of force for depressing said charging terminal of said stationary apparatus and another direction of force for depressing said lever.

15. The charging apparatus as claimed in claim 14, wherein said isolating switch is provided with a spring comprising a first portion having a relatively small spring constant and a second portion having a relatively large spring constants.

16. The charging apparatus as claimed in claim 15, wherein said first portion pushes said lever, and said second portion is capable of depressing an electric contact point.

17. An isolating switch comprising:
   a spring including a first portion having a relatively small spring constant and a second portion having a relatively large spring constant;
   a lever connected to said springs, and
   a pair of electric contact points, wherein a force created by the first portion of said spring pushes said lever, and a force created by the second portion of said spring depresses said pair of electric contact points.

18. The isolating switch as claimed in claim 17, wherein said spring is a double-torsional spring.

* * * * *